(12) United States Patent
Blankenship et al.

(10) Patent No.: US 6,383,981 B1
(45) Date of Patent: May 7, 2002

(54) ADSORBENT FOR THE REMOVAL OF TRACE QUANTITIES FROM A HYDROCARBON STREAM AND PROCESS FOR ITS USE

(75) Inventors: Steven A. Blankenship, Radcliff, KY (US); Richard W. Voight, Houston, TX (US)

(73) Assignee: Süd-Chemie Inc., Louisville, KY (US)

( * ) Notice: Subject to any disclaimer, the term of this patent is extended or adjusted under 35 U.S.C. 154(b) by 0 days.

(21) Appl. No.: 09/357,735

(22) Filed: Jul. 20, 1999

(51) Int. Cl.$^7$ .......................... B01J 20/02; B01J 20/10; B01J 20/00; B01J 20/14

(52) U.S. Cl. ................ 502/406; 502/410; 502/412; 502/414; 502/415

(58) Field of Search .................. 502/406, 410, 502/412, 414, 415

(56) References Cited

U.S. PATENT DOCUMENTS

| | | | |
|---|---|---|---|
| 3,893,949 A | * | 7/1975 | Sakai et al. ............. 204/627 |
| 4,177,203 A | * | 12/1979 | Kolbel et al. ............ 502/301 |
| 4,486,298 A | | 12/1984 | Bowes et al. |
| 4,489,047 A | | 12/1984 | de Jong et al. |
| 4,729,889 A | | 3/1988 | Flutani-Stephanopoulos |
| 4,992,620 A | | 2/1991 | Nowack et al. |
| 5,085,844 A | | 2/1992 | Nowack et al. |
| 5,157,201 A | | 10/1992 | Norris |
| 5,268,091 A | | 12/1993 | Boitiaux et al. |
| 5,281,445 A | | 1/1994 | Khare |
| 5,421,994 A | | 6/1995 | Sarrazin et al. |
| 5,648,312 A | * | 7/1997 | Rivas et al. ............. 502/325 |
| 5,700,439 A | | 12/1997 | Govette et al. |
| 5,955,393 A | * | 9/1999 | Moskovitz et al. ......... 502/5 |

FOREIGN PATENT DOCUMENTS

| | | |
|---|---|---|
| DE | A2319532 | 10/1973 |
| DE | A2356519 | 5/1974 |
| DE | A2439234 | 2/1975 |
| DE | A2530091 | 1/1976 |
| DE | A2617649 | 11/1977 |
| DE | A2822235 | 11/1978 |
| DE | A3029187 | 4/1982 |
| DE | A3029188 | 4/1982 |
| DE | A3512352 | 10/1985 |
| DE | A3526153 | 1/1986 |
| DE | A3719138 | 12/1988 |
| DE | C3816599 | 3/1989 |
| DE | A4109312 | 9/1991 |
| GB | 1 144 071 | 3/1969 |
| WO | WO 93/07237 | 4/1993 |

* cited by examiner

*Primary Examiner*—Walter D. Griffin
*Assistant Examiner*—Tam M. Nguyen
(74) *Attorney, Agent, or Firm*—Scott R. Cox

(57) ABSTRACT

An adsorbent product for the adsorption of trace elements of sulfur, arsenic, mercury, compounds which contain these elements or metal hydrides from a hydrocarbon gas stream, preferably an olefinic or paraffinic stream, wherein the adsorbent product is iron oxide and manganese oxide placed on a support material, preferably aluminum oxide. Also disclosed is a process for the use of this adsorbent product for the removal of trace elements of arsenic, mercury and sulfur or compounds containing those elements or metal hydrides from a hydrocarbon gas stream, preferably an olefinic or paraffinic gas stream.

18 Claims, 1 Drawing Sheet

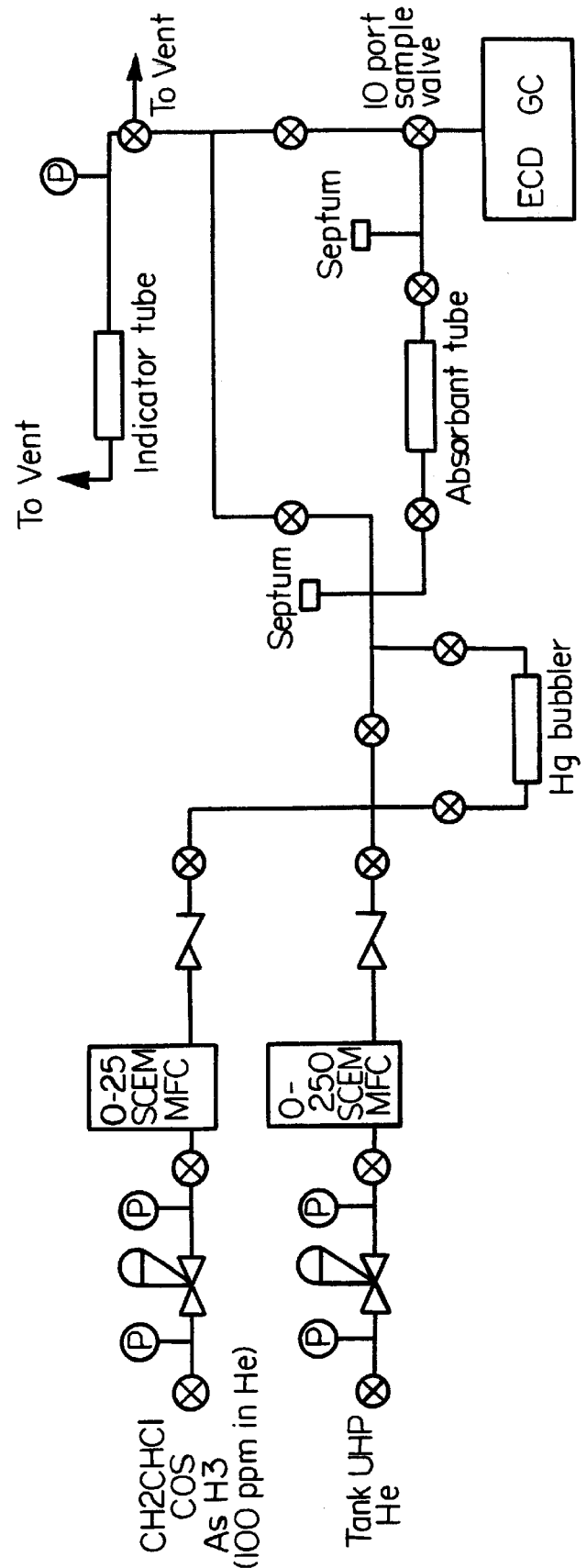

ADSORBENT FOR THE REMOVAL OF TRACE QUANTITIES FROM A HYDROCARBON STREAM AND PROCESS FOR ITS USE

BACKGROUND OF INVENTION

This invention relates to adsorbents for the removal of trace elements from hydrocarbon stream and a process for their use. More particularly, it relates to an adsorbent for adsorbing mercury, arsenic, sulfur, metal hydrides and related compounds from a hydrocarbon stream, preferably an olefinic or paraffinic stream and a process for its use. This invention also relates to a process for the production of the adsorbent.

Removal of trace elements or impurities from a gas stream is important in the preparation of various hydrocarbon products. Trace elements or impurities, such as sulfur, arsenic, mercury or metal hydrides and compounds which contain these elements, must be removed from gas streams, or they interfere with the production of the hydrocarbon end products. To remove these trace elements or impurities from a gas stream, two different types of products are commonly used: (a) adsorbents to adsorb these impurities or (b) catalysts on which these impurities are chemically reacted.

Adsorbents of this type are described in DE-A-2 319 532. This reference discloses a process for purifying waste gases containing hydrogen sulfide, sulfur dioxide and dust-like sulfur in small concentrations. The waste gases are passed over an adsorbent comprising aluminum oxide or a combination of aluminum oxide and silicon dioxide.

German patent application DE-A-3 719 138 discloses a combustion unit, wherein in order to preserve the activity of a denox catalyst, adsorbents are placed upstream from the catalyst. The adsorbents are designed for the removal of arsenic oxide from the gas stream. The adsorbent products can be used alone or in conjunction with other products. Silica gel, iron oxide, manganese oxide, titanium oxide, molybdenum oxide, alkaline earth oxides and zeolites can be used as an element of the adsorbent.

DE-A-3 029 197 and DE-A-3 029 188 disclose methods for removing hydrogen sulfide from gas mixtures containing hydrocarbons, wherein carbon-containing molecular sieves or activated charcoal are used as adsorbents.

DE-A-2 822 235 discloses a method for removing mercaptan from petroleum distillates whereby the distillants are treated with a weakly basic anion exchanger resin.

DE-A-2 530 091 discloses a method for selectively removing hydrogen sulfide from hydrocarbons wherein a molecular sieve comprising a crystalline zeolite is used.

DE-A-2 356 519 discloses a method for the de-aromatization and de-sulfurization of hydrocarbon mixtures wherein cation exchangers modified with basic nitrogen compounds are used.

DE-A-3 512 352 discloses a method for removing carbonyl sulfide from liquid hydrocarbon feeds. According to this method, the feed is passed over an adsorbent consisting of an anionic ion exchange resin with an amino function.

Arsenic compounds are generally removed from gas mixtures by adsorption. In the past, activated charcoal was generally used for this purpose. Newer adsorbent products for arsenic compounds are disclosed in DE-C-3 816 599 which proposes a method for removing arsenic compounds from waste gases wherein the arsenic-containing waste gas is passed over a sorbent having a large surface area. The sorbent is based on titanium oxide and may, in addition, contain transition metal oxides, such as the oxides of vanadium and/or molybdenum, or tungsten. Furthermore, the sorbent may also contain zirconium oxide and/or clay or silica and/or alumosilicates and/or aluminum oxide.

U.S. Pat. No. 4,729,889 discloses a hydrogen sulfide sorbent which is regenerable. The preferable metals which are included in this product include zinc and iron, copper and iron, copper and aluminum, and copper, molybdenum and iron.

In addition to adsorbent products for the removal of various types of impurities from a gas stream, catalysts are also disclosed for the removal of materials, such as sulfur compounds, including hydrogen sulfide from a hydrocarbon stream. These catalysts are disclosed, for example, by DE-A-2 617 649 which discloses an alumina catalyst which may be impregnated with iron, nickel and/or cobalt.

JP 71-021362 discloses a product for desulfurizing a gas stream utilizing manganese ferrite prepared by mixing an aqueous solution of manganese salt and ferrous salt with an aluminum salt form a co-precipitate of manganic salt and a ferrous salt of an organic-inorganic acid.

JP 71-020688 discloses a gas desulfurization agent using a gamma-iron oxide-based agent.

U.S. Pat. No. 4,489,047 discloses a process for removing hydrogen sulfide from certain process gases using solid acceptors, wherein the acceptors are comprised of an alumina product onto which is placed a metal oxide which may be a manganese oxide or iron oxide, wherein the metal constitutes 2 to 20 percent, preferably 7 to 10 percent, of the acceptor.

A method for removing carbonyl sulfide from liquid hydrocarbon feeds is disclosed in DE-A-2 526 153. In this method, nickel, which is deposited on a carrier, such as aluminum oxide, is used as the catalyst.

DE-A-2 439 234 discloses a method for removing sulfur oxides from gases by means of a catalyst which places an oxide layer of a transition metal on a shaped refractory substrate with small surface area. Both the substrate and the oxide layer may consist of aluminum oxide. Copper oxide is preferably used as the active material because it is sulfated by sulfur dioxide.

DE-A-4 109 312 discloses a catalyst for removing antimony hydride from liquid hydrocarbon compounds containing nickel deposited on a support material.

DE-C-4 224 676 discloses a method for removing mercury from flue gases by contacting the gases with an oxidation catalyst. The metallic mercury portion is oxidized and the ionic mercury is then dissolved in the washing water and is subsequently removed from the washing water by precipitation or adsorption. Generally, a denox catalyst is used as the oxidation catalyst. An additional catalyst for the hydrogenation of acetylene-alcohols is prepared by a process wherein the hydrogenation catalyst contains the oxides of the metals nickel, copper, molybdenum and aluminum and/or iron and may or may not contain manganese oxide.

While many of these products can be utilized for the removal of sulfur products, such as hydrogen sulfide, from a gas stream, it is important that simple, inexpensive adsorbent products be developed for the removal of a broad range of impurities from hydrocarbons streams, especially olefinic gas streams.

Therefore, it is an aspect of the present invention to provide an adsorbent for the removal of trace quantities of sulfur, mercury, arsenic, metal hydrides and compounds containing those elements or compounds, from a hydrocarbon stream, especially an olefinic gas stream.

It is an additional aspect of this invention to develop an adsorbent for the removal of catalyst poisons which may adversely affect the performance of platinum and palladium catalysts used within a gas stream.

It is an additional aspect of the invention to disclose a process for the production of an adsorbent for the removal of trace quantities of sulfur, mercury, arsenic, metal hydrides and mixtures thereof from a gas stream.

It is a still further aspect of the invention to disclose a process for the removal of trace elements of arsenic, sulfur, mercury, metal hydrides and mixtures thereof from a gas stream, particularly an olefinic or paraffinic gas stream.

It is an additional aspect of the invention to disclose a process for removal of impurities from a C1 to C12 olefinic or paraffinic gas stream.

These and other aspects can be obtained by the processes and product disclosed by the present invention.

SUMMARY OF INVENTION

In accordance with the present invention there is provided an adsorbent useful for the removal of trace elements such as mercury, arsenic, sulfur, metal hydrides and compounds containing those elements or compounds, from a hydrocarbon stream, preferably an olefinic or paraffinic gas stream, more preferably a C1 to C12 hydrocarbon gas stream, wherein the adsorbent comprises about 40 to about 65 percent iron oxide, about 15 to about 50 percent manganese oxide and about 10 to about 20 percent carrier, wherein the carrier is preferably alumina, titania, silica, or mixtures thereof.

The invention is also a process for the production of an adsorbent product for the removal of trace elements of mercury, sulfur, arsenic, metal hydrides and compounds containing those elements or compounds comprising coprecipitating a solution of salts of iron and manganese onto a carrier to produce a preliminary product, which preliminary product is washed, dried and calcined to produce an adsorbent end product comprising about 40 to 65 percent iron oxide, about 15 to about 50 percent manganese oxide and about 10 to about 20 percent support material. Alternatively, the iron oxide and manganese oxide adsorbent product can be produced by impregnation of the metal oxide onto the support material.

The invention is also a process for the removal of trace elements of arsenic, sulfur, mercury, metal hydrides or compounds containing those elements or compounds from a hydrocarbon stream, preferably an olefinic or paraffinic stream, comprising contacting the gas stream with an adsorbent product, wherein the product comprises about 40 to about 65 percent iron oxide, about 15 to about 50 percent manganese oxide and about 10 to about 20 percent support material, preferably aluminum oxide, titanium oxide, silica oxide, or mixtures thereof.

BRIEF DESCRIPTION OF THE DRAWINGS

The FIGURE is a schematic of the experiment by which the various products were tested for adsorption of trace amounts as discussed in the Example.

DESCRIPTION OF THE INVENTION

The adsorbent product of the present invention is preferably comprised of the following components: iron oxide, manganese oxide and a support material.

The ratio of the iron oxide to manganese oxide should be in the range from about 3 to 1 to about 1 to 3. The optimum loading of the metal oxides on the support material should be in the range of about 50 to about 90 percent. Lower metal loadings are not as effective for the removal of impurities in gas streams. However, partial absorbency of impurities in gas streams can be obtained with metal loadings as low as about 2 percent.

In a preferred embodiment, the percentage of the components of the adsorbent are from about 40 to about 65 percent iron oxide, 15 to about 50 percent manganese oxide, and about 10 to about 20 support material. In a more preferred embodiment, the adsorbent contains from about 50 to 60 percent iron oxide, 20 to about 30 percent manganese oxide, and about 10 to about 20 percent support material. The support material is preferably titania, silica, alumina, or mixtures thereof, more preferably alumina.

The adsorbents used according to the present invention may be prepared by conventional processes for production of this type of adsorbent product, such as coprecipitation, decomposition, impregnation and mechanical mixing. Preferably the adsorbent material are produced by coprecipitation or decomposition. The method chosen should guarantee intense blending of the components.

The percentage of the support material produced using the impregnation process can be as high as about 95 percent by weight, while the proportion of the adsorbent produced using the co-precipitation process will not exceed about 25 percent, by weight, of the adsorbent material. In coprecipitation the catalyst is prepared by mixing the acidic metal salts of iron, manganese and aluminum, preferably nitrates or sulfates, with a basic bicarbonate solution in a pH range from about 6 to 9 at a temperature from ambient to about 80° C. to produce a precipitant, washing the precipitant product at a temperature ranging from ambient to about 50° C., filtering the precipitant product at ambient temperatures, drying the precipitant at a temperature range from about 100 to 160° C., calcining the precipitant at a temperature from about 170 to 500° C. and finally forming the product into the desirable size and shape by conventional processes, such as extrusion and tableting.

Alternatively, the product can be prepared by a decomposition method, such as is disclosed in U.S. Pat. No. 3,615,217, which is incorporated herein by reference. In the preparation utilizing the decomposition method, iron and manganese complexes are mixed with an appropriate form of the support material. For example, if the support material is aluminum oxide, it is mixed with the iron and manganese complexes. The solution is then heated to about 120° C. in a container either under vacuum or at ambient pressure and the product which is obtained is then post treated. The post treatment procedure is similar to the procedure used in the coprecipitation method.

Impregnation of the solution onto a support can be carried out at any stage during the preparation. Preferably, it is advantageous to spray or mix the solution containing the product onto the slurry of the support after aging, washing, filtration or drying.

The BET surface of the adsorbent product is at least about 50 m²/g to about 250 m²/g. The specific pore volume of the adsorbent determined by Hg porosimetry is preferably from about 0.3 cc/g to about 0.55 cc/g. Specific pore volume is determined according to the mercury penetration method described in J. van Brekel, et al. Powder Technology, 29, p. 1, (1981). In addition the absorbent product preferably has a compacted bulk density of about 0.4 to 1.1 g/cc.

Once the material is in this preliminary product form, known methods can be used to form the final adsorbent product, such as pelletizing and extrusion. The adsorbent product preferably is then formed into moldings especially in the form of spheres or pellets, preferably ranging in size from about 1/16 inch to about 3/8 inch across.

The adsorbent is preferably employed in a process for the removal of trace elements of mercury, arsenic and sulfur, or compounds containing such elements along with metal hydrides, such as $PH_3$, $SbH_3$, and $SiH_4$, from a hydrocarbon gas stream, preferably an olefinic or paraffinic gas stream and preferably where a platinum or palladium catalyst is utilized in the process. Preferably, the adsorbent can be used to purify ethylene, propylene, butene and cracked raw gas streams prior to introduction into a hydrogenation reactor. The temperature range of the gas stream is preferably from about ambient to about 500° C. The impurities to be removed from the gas stream become bound to the adsorbent products. The residual amount of impurities in the gas stream will depend on the concentration of the original impurities in the gas stream. For example, mercury levels up to about 2.3 mg/m$^3$ can be reduced to 20 about 0.1 mg/m$^3$. COS levels up to about 100 ppm by volume can be reduced to about 0.5 ppm. Arsine levels up to about 100 ppm by volume can be reduced to about 0.1 ppm.

EXAMPLE

The adsorption capacity of the invention is demonstrated in Table 1 where the invented product is compared to six commercially available adsorbents. The seven adsorbent products were obtained and placed into a laboratory-scale adsorption apparatus to evaluate their capacity to absorb COS, Hg, and $AsH_3$. The composition of these adsorbent products is shown on Table 1.

Four of the adsorbent materials were used without pretreatment. Two of the adsorbent products, C28 R&S and G-132D R&S were reduced "in situ" with hydrogen prior to the adsorption experiment. Reduction was done at 150° C. for two hours using a hydrogen stream.

All adsorption studies were done with the adsorbent bed at room temperature and atmospheric pressure.

Formation of adsorbent of the invention:

The adsorbent was produced in the following manner:

A mixed metal nitrate solution was prepared by dissolving 22.04 kg of $Fe(NO_3)_3.9H_2O$ in 40 liters of deionized water. This solution was then mixed with 7.6 liters of a $Mn(NO_3)_2$ solution that was 15.5% Mn by weight. A second solution of $Na_2CO_3$ was prepared by dissolving 21.1 kg in 105 liters of deionized water. The mixed metal solution was placed into a precipitation tank. The solution was heated to 140° F. with agitation. At 140° F. the $Na_2CO_3$ solution was pumped into the mixed metal nitrate solution at a rate of 1.2 liter/minute. At the end of the $Na_2CO_3$ addition, the pH was 7.4. The precipitate was aged at 140° F. for 30 minutes. The slurry was filtered through an appropriate device, such as a filter press. The filter cake was reslurried and washed to remove excess sodium. Two washings were adequate to lower the sodium level. The filter cake was dried at 700° F. for 3 hours. At this point the filter cake was ground into powder and formed into tablets or extrudates.

Testing of adsorbent products.

A schematic of the experiment is attached as the FIGURE. An explanation of the terms contained in the FIGURE are as follows:

$CH_2CHCl$—vinyl chloride

COS—carbonyl sulfide $AsH_3$—arsine

He—helium

UHP He—ultra high purity helium (0–25 SCCM) MFC—(1 to 25 standard cubic centimeters per minute range) mass flow controller (0–250 SCCM) MFC—(0 to 250 standard cubic centimeters per minute range) mass flow controller Hg bubbler—ultra high purity helium routed through a Sherer impinger (275 ml) equipped with a 25 nm fitted disc (20–50 microns) and filled with 75 ml of ACS grade mercury ECD GC—gas chromatograph fitted with an electron capture detector for arsine detection and a sieves Chemiluminescence Sulfur Detector for carbonyl sulfide detection Indicator Tube—Matheson-Kitagawa Precision Detector tubes for/mercury detection In order to test the adsorption capabilities of the various adsorbent products, a small quantity of the trace element(s) to be absorbed was introduced into a helium stream. The trace elements introduced included COS and $AsH_3$. The concentration of the COS and $AsH_3$ was about 100 parts per million. After the gas with the trace elements passed through the adsorption bed, it was tested to determine the residual amount of trace elements. In order to test for mercury, the gas stream was first routed through a Sherer impinger (275 ml) equipped with a 25 nm threaded disc (25–50 microns) and filled with about 75 ml of ACS grade mercury before the guard bed, which resulted in the gas stream containing 2.3 mg/m$^3$ mercury.

The support for the adsorbent was a stainless steel wire mesh, which was packed with the adsorbent product to be studied to give an approximate bed volume for an L/D equal to 7 or to 15, depending on the test. Once the adsorbent product was installed, the entire system was flushed with helium. After the helium flush, the test gas with trace elements present was passed through the different adsorbent products.

The results of the mercury adsorption studies are shown on Table 1. All of the adsorbent products showed some capacity to adsorb mercury. However, the adsorbent product produced according to the present invention was clearly the best adsorbent product for mercury adsorption.

The results of the arsenic adsorption tests are also shown on Table 1, wherein the catalyst of the present invention also showed significant utility.

The results of the COS adsorption tests are also shown on Table 1, wherein the catalyst of the present invention also showed significant utility.

As a result of the experiments, it is clear that the adsorption product of the present invention has great utility for the removal of certain types of trace elements such as arsenic and mercury which pollute gas streams, especially olefinic gas streams.

TABLE I

| Adsorbent | Supplier | Composition | Adsorbent Pre-Treatment | Carbonyl Sulfide Capacity | | Mercury Capacity | | Arsine Capacity | |
|---|---|---|---|---|---|---|---|---|---|
| | | | | g COS/g Adsorbent | Wt. % | g Hg/g Adsorbent | Wt. % | g AsH3/g Adsorbent | Wt. % |
| Invention | UCI | 55% Fe2O3, 27% MnO2, 15% Al2O3 | None | 0.06221 | 6.22 | 0.02343 | 2.34 | 0.18673 | 18.7 |
| T-2552 | UCI | 6% Ag on Al2O3 | None | 0.02281 | 2.28 | 0.00229 | 0.23 | 0.0323 | 3.23 |
| E-315 | Calsicat | PbO on Al2O3 | None | 0.04044 | 4.04 | 0.00000 | 0.0 | 0.01047 | 1.05 |
| T-2525 | UCI | 45% MnO2 on Al2O3 | None | 0.00277 | 0.28 | 0.00027 | 0.027 | 0.00377 | 0.38 |
| T-2550 | UCI | 17% CuO, 29% MnO2 on Al2O3 | None | 0.05295 | 5.3 | 0.00002 | 0.002 | 0.14852 | 14.9 |
| C28 | UCI | 52% NiO2, 29% SiO2, 10% Al2O3 | Reduced | 0.32088 | 32.1 | 0.00218 | 0.128 | 0.40268 | 40.3 |
| G-132D | UCI | 55% CuO, 27% ZnO, 15% Al2O3 | Reduced | 0.01517 | 1.52 | 0.00068 | 0.068 | 0.02613 | 2.61 |

What is claimed is:

1. An adsorbent for the removal of trace impurities of mercury, arsenic, metal hydrides, chlorides or compounds containing those impurities from a hydrocarbon stream comprising iron oxide, manganese oxide, and a support material, wherein the percentage by weight of the iron oxide and the manganese oxide in the adsorbent product is at least about 50 percent, wherein the percentage of manganese oxide is from about 20 to about 30 percent by weight and wherein the ratio of the iron oxide to the manganese oxide by weight is between about 3 to 1 and about 1 to 3.

2. An adsorbent product for the removal of trace impurities of mercury, arsenic, metal hydrides, chlorides or compounds containing those impurities from a hydrocarbon stream comprising about 40 to about 65 percent iron, oxide; about 20 to about 30 percent manganese oxide and from about 10 to about 20 percent of a support material.

3. The adsorbent of claim 1 wherein the support material is selected from the group consisting of aluminum oxide, silicon oxide, titanium oxide and mixtures thereof.

4. The adsorbent of claim 2 wherein the support material is selected from the group consisting of aluminum oxide, silicon oxide, titanium oxide, and mixtures thereof.

5. The adsorbent of claim 1 wherein the hydrocarbon gas stream is maintained at a temperature of about ambient to 500° C.

6. The adsorbent of claim 2 wherein the hydrocarbon gas stream is maintained at a temperature of about ambient to 500° C.

7. The adsorbent of claim 1 wherein the hydrocarbon gas stream contains less than about 1 ppm oxygen.

8. The adsorbent of claim 2 wherein the hydrocarbon gas stream contains less than about 1 ppm oxygen.

9. The adsorbent of claim 1 wherein the hydrocarbon stream comprises an olefinic or paraffinic gas stream.

10. The adsorbent of claim 2 wherein the hydrocarbon stream comprises an olefinic or paraffinic gas stream.

11. The adsorbent of claim 9 wherein the olefinic gas stream contains C1 to C12 hydrocarbons in gas or liquid phase.

12. The adsorbent of claim 10 wherein the olefinic gas stream contains, C1 to C12 hydrocarbons in gas or liquid phase.

13. The adsorbent of claim 1 further comprising a surface area of at least about 50 m$^2$/g to about 250 m$^2$/g.

14. The adsorbent of claim 2 further comprising a surface area of at least about 50 m$^2$/g to about 250 m$^2$/g.

15. The adsorbent of claim 1 further comprising a pore volume of from about 0.3 cc/g to about 0.55 cc/g.

16. The adsorbent of claim 2 further comprising a pore volume of from about 0.3 cc/g to about 0.55 cc/g.

17. The adsorbent of claim 1 further comprising from about 50 to about 60 percent iron oxide and about 10 to about 20 percent support material.

18. The adsorbent of claim 2 further comprising from about 50 to about 60 percent iron oxide and about 10 to about 20 percent support material.

* * * * *